United States Patent [19]

Joung

[11] Patent Number: 5,460,334

[45] Date of Patent: Oct. 24, 1995

[54] TAPE TENSION CONTROL APPARATUS FOR VIDEO CASSETTE RECORDER

[75] Inventor: Mun C. Joung, Seoul, Rep. of Korea

[73] Assignee: Goldstar Co., Ltd., Rep. of Korea

[21] Appl. No.: 190,877

[22] Filed: Feb. 2, 1994

[30] Foreign Application Priority Data

| | | | |
|---|---|---|---|
| Feb. 6, 1993 | [KR] | Rep. of Korea | 1643/1993 |
| Mar. 22, 1993 | [KR] | Rep. of Korea | 4272/1993 |
| Mar. 22, 1993 | [KR] | Rep. of Korea | 4427/1993 |
| Mar. 22, 1993 | [KR] | Rep. of Korea | 4428/1993 |

[51] Int. Cl.$^6$ .......................... G11B 15/43; B65H 23/08
[52] U.S. Cl. .................... 242/334.6; 242/421.7; 242/422; 242/422.8; 360/85
[58] Field of Search .............. 242/334.6, 334.2, 242/334, 421.7, 421.8, 422.8, 422.3, 421.6, 421.5, 156.2, 357, 912, 422.4, 422; 360/71, 85, 95

[56] References Cited

U.S. PATENT DOCUMENTS 4,614,315  9/1986  Gerrits et al. ................ 242/334.6

FOREIGN PATENT DOCUMENTS 4-139645  5/1992  Japan .

Primary Examiner—John Q. Nguyen
Attorney, Agent, or Firm—Ostrolenk, Faber, Gerb & Soffen

[57] ABSTRACT

A tape tension control apparatus for a VCR capable of variously and precisely controlling the tension of a tape in accordance with the using purpose by sensing the tension of a tape by sensing device such as a photosensor or a Hall sensor, driving tension member driving device, based on a sensing signal from the sensing device, thereby electrically controlling the tension of the tape. The apparatus includes a tension sensing unit for sensing the tension of a tape, a tension member partially received in an annular groove formed on a peripheral surface of the supply reel of a tape cassette and adapted to apply a variable frictional force to the supply reel, a tension member driving unit operatively connected to the tension member to control the tension member and thereby control the variable frictional force applied to the supply reel in accordance with a sensing signal from the tension sensing unit, and an electrical control unit adapted to control the tension member driving device in accordance with the sensing signal from the tension sensing device.

5 Claims, 7 Drawing Sheets

TAPE TENSION CONTROL APPARATUS FOR VIDEO CASSETTE RECORDER

BACKGROUND OF THE INVENTION

1. Field of the Invention

The present invention relates to a tape tension control apparatus for a video cassette recorder (VCR), and more particularly to a tape tension control apparatus capable of precisely controlling the tension of a tape in accordance with the using purpose by use of photosensors and a Hall sensor.

2. Description of the Prior Art

Recently, VCRs have been rapidly popularized with the progress of magnetic recording technologies. With the spread of VCRs, there have been a demand for VCRs being inexpensive, but having a variety of functions.

Refering to FIG. 1, there is illustrated a conventional VCR having a tape tension control function.

In FIG. 1, the reference numeral 12 denotes a rotatable head drum 12 slantly arranged at predetermined angle on a chassis (not shown) supporting a tape cassette 18. The head drum 12 faces the front surface of the tape cassette 18. The tape cassette 18 of the general type has a supply reel 7, a take-up reel 8, and a tape 9 wound around the supply reel 7 and the take-up reel 8. The tape 9 from the supply reel 7 is taken out of the tape cassette 18 via guide posts a and b, wound around the head drum 12 via a tension post 1, an impedance roller 17a and guide posts 10 and 11, introduced in the tape cassette 18 again via guide posts 13 and 14, a capstan 15, a pinch roller 17 and a guide roller 16, and then taken up around the take-up reel 8 via guide posts a and b.

The conventional VCR having the above-mentioned construction includes a tension control device. As shown in FIG. 1, the conventional tension control device comprises a tension lever 2 pivotally mounted to the chassis and attached at one end thereof with the tension post 1, and a tension spring 3 connected at one end thereof to the other end of the tension lever 2 and at the other end thereof to the chassis. A tension band 5 is wound around a part of a peripheral surface of the supply reel 7 so as to adjust the tension of the tape 9. The tension band 5 has one end connected to a fixing member 6 fixedly mounted to the chassis and tile other end connected to a connecting member 4 pivotally mounted to the tension lever 2.

Now, an operation of the conventional tape tension control device having the above-mentioned construction will be described.

In a play mode operation of The VCR, The Tape 9 from the supply reel 7 is taken out of the tape cassette 18 and then wound around a part of the peripheral surface of the tension post 1. Thereafter, the tape 9 comes into contact with the peripheral surface of the rotating head drum 12. Under the condition, the tape 9 is travelled by a frictional feeding force applied thereto by the capstan 15 and the pinch roller 17. When a tension of the tape 9 is excessively increased during the travel of the tape 9, the tension lever 2 pivots about a pin 19 in clockwise by the tension applied thereto via the tension post 1. As a result, the tension of the tension band 5 applied as a frictional force to the supply reel 7 is decreased, thereby causing the amount of the tape 7 being taken out to be increased. Accordingly, the tension of the tape 9 is controlled to be decreased. On the contrary, when the tension of the tape 9 is excessively decreased during the travel of the tape 9, the tension lever 2 pivots about the pin 19 in anti-clockwise by the resilience of the tension spring 3. As a result, the frictional force of the tension band 5 applied to the supply reel 7 is increased, thereby causing the amount of the tape 7 being taken out to be decreased. Accordingly, the tension of the tape 9 is controlled to be increased.

However, it is difficult to constantly maintain the tension of the tape 9. This is because the above-mentioned tension control operations are continuously repeated during the travel of the tape. Furthermore, the conventional tape tension control device has a limitation on a precise control because the tension of the tape is controlled by the tension spring, the tension band, and the connecting member connecting the tension lever and the tension band.

Recently, more various and precise tension controls have been required with a variety of functions of VCRs and various kinds of tapes including a ferrite tape and a metal tape which are used in high density (HD) VORs recently developed. However, known tension control devices could not satisfy such a requirement.

SUMMARY OF THE INVENTION

Therefore, an object of the invention is to provide a tape tension control apparatus for a VCR capable of variously and precisely controlling the tension of a tape in accordance with the using purpose by sensing the tension of a tape by sensing means such as a photosensor and a Hall sensor, driving tension member driving means, based on a sensing signal from the sensing means, thereby electrically controlling the tension of the tape.

Another object of the invention is to provide a tape tension control apparatus for a VCR capable of simply controlling the tension of a tape in accordance with a recording type used or an operating system used by the provision of a tension spring made of a shape memory alloy and resiliently supporting a tension lever for controlling the tension of the tape.

In accordance with one aspect, the present invention provides a tape tension control apparatus for a video cassette recorder comprising: a tension lever pivotally mounted to a chassis of said video cassette recorder and adapted to apply a tension to a tape taken out of a tape cassette; tension sensing means including a support member having a pair of spaced side portions, a pair of photosensors attached to facing inner surfaces of said side portions of the support member, one of said photosensors serving as a light emitting element while the other photosensor serving as a light receiving element, and a tension spring disposed between the photosensors in a space defined by the side portions of the support member and connected at one end thereof to said tension lever and at the other end thereof to said chassis, said tension spring being adapted to urge said tension lever in a direction that said tape is tensed; a tension member operatively connected with a supply reel of said tape cassette and adapted to apply a variable frictional force to said supply reel; tension member driving means operatively connected to said tension member to control the tension member and thereby control said variable frictional force applied to the supply reel in accordance with a sensing signal from said tension sensing means, said sensing signal being indicative of a sensed tension of the tape; and control means adapted to control said tension member driving means in accordance with said sensing signal from the tension sensing means.

In accordance with another aspect, the present invention provides a tape tension control apparatus for a video cassette recorder comprising: a tension lever pivotally mounted to a chassis of said video cassette recorder and adapted to apply a tension to a tape taken out of a tape cassette; a sensing member protruded from one side portion of said tension lever; tension sensing means including a support member having an upper portion and a lower portion both defining a space in which said sensing member is movable, a downwardly extending magnet fitted in a throughout hole provided at said upper portion of said support member, and a Hall sensor mounted on said lower portion of the support member; a tension member operatively connected with a supply reel of said tape cassette and adapted to apply a variable frictional force to said supply reel; tension member driving means operatively connected to said tension member to control the tension member and thereby control said variable frictional force applied to the supply reel in accordance with sensing signal from said tension sensing means, said sensing signal being indicative of a sensed tension of the tape; and control means adapted to control said tension member driving means n accordance with said sensing signal from the tension sensing means.

The tension member driving means may include a lever connected at one end thereof to the tension member and at the other end thereof to a tension spring fixedly mounted to the chassis, a motor disposed beneath the lever, and an eccentric cam fixedly mounted on a shaft of the motor such that it is in contact with the lower surface of the lever.

BRIEF DESCRIPTION OF THE DRAWINGS

Other objects and aspects of the invention will become apparent from the following description of embodiments with reference to the accompanying drawings in which.

DESCRIPTION OF THE PREFERRED EMBODIMENTS

Figure 1:
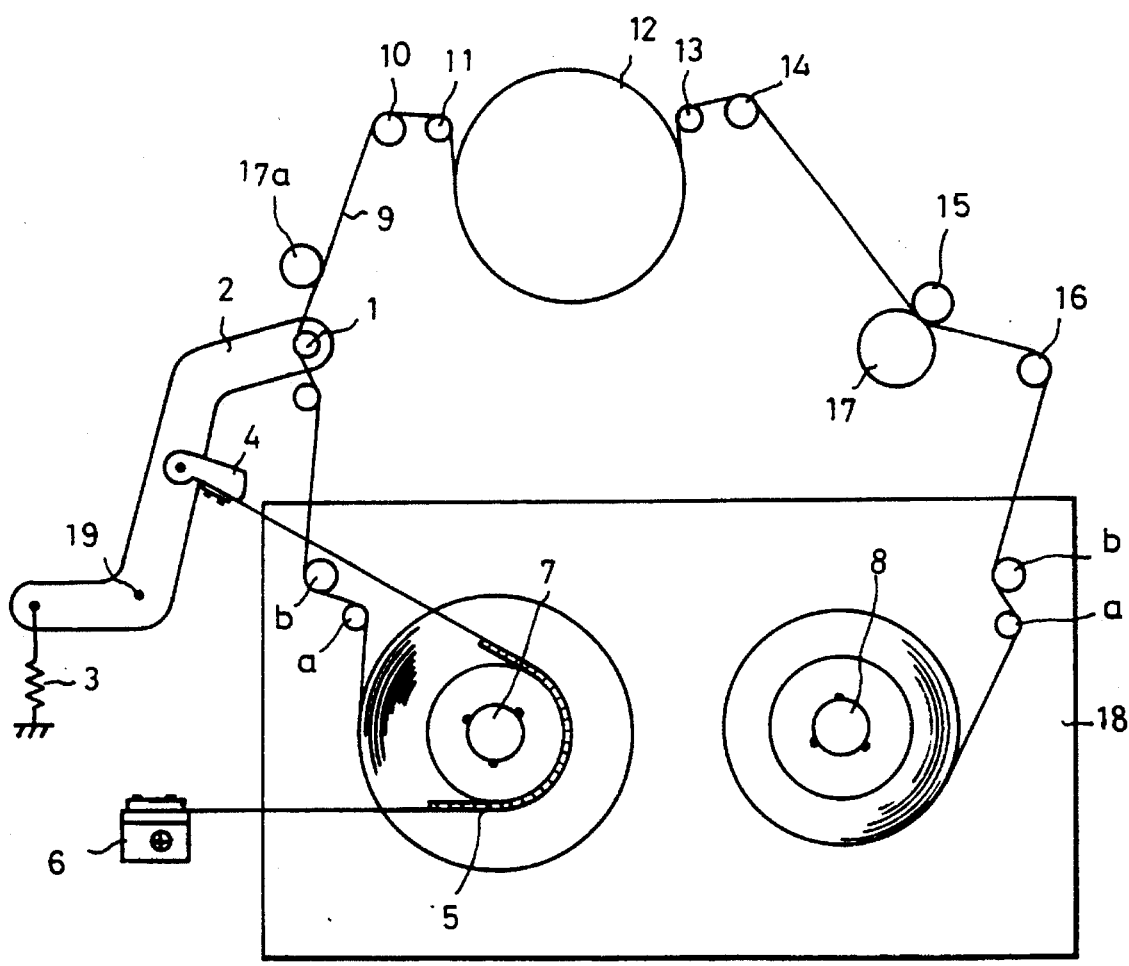
FIG. 1 is a schematic plan view of a conventional tension control device for a VCR.
Figure 2:
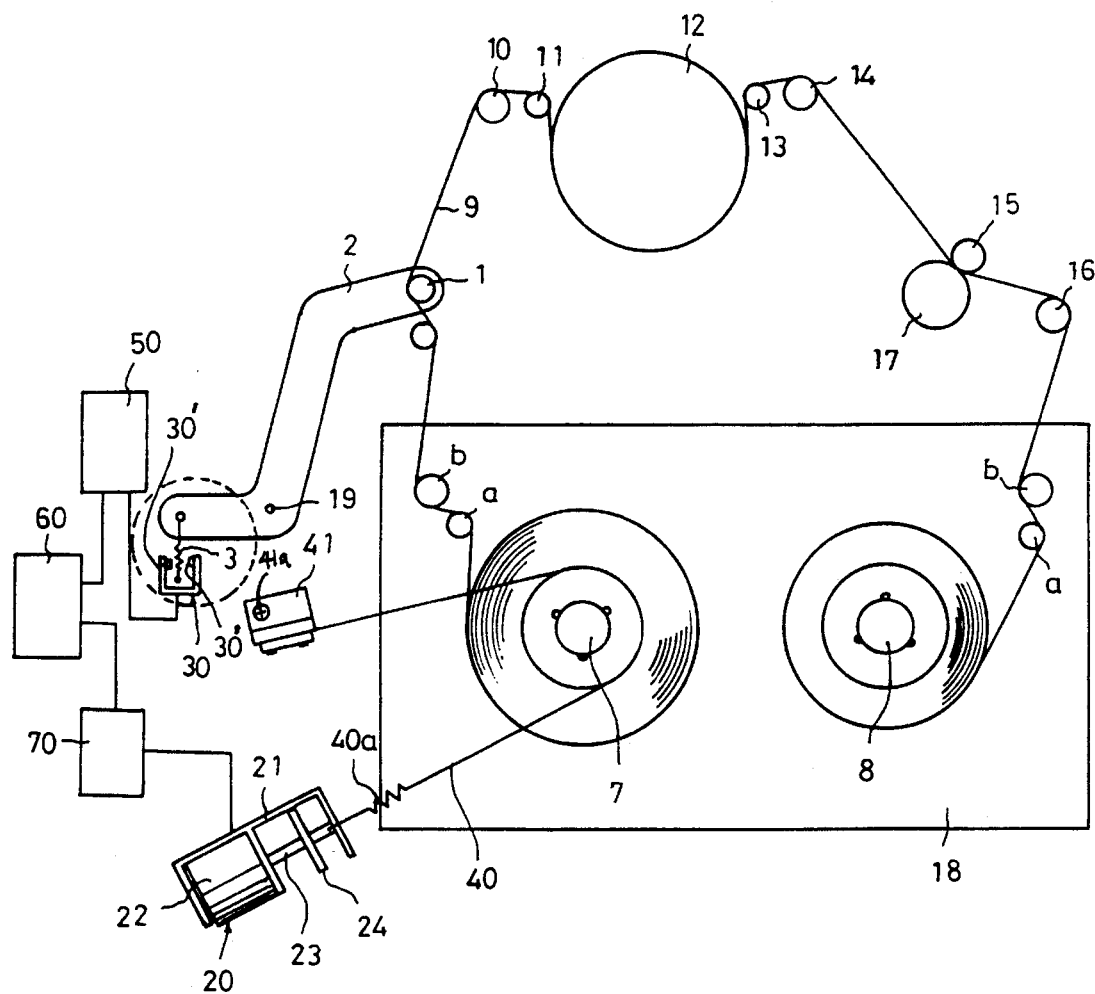
FIG. 2 is a schematic plan view of a tape tension control apparatus for a VCR in accordance with a first embodiment of the present invention.

FIG. 2 is a schematic plan view of a tape tension control apparatus for a VCR in accordance with a first embodiment of the present invention. In FIG. 2, elements corresponding to those in FIG. 1 are denoted by the same reference numerals. The VCR shown in FIG. 2 includes a system for travelling a magnetic tape 9 taken up around a supply reel 7. The tape travelling system of FIG. 2 is the same as that of FIG. 1 and, thus, its detailed description will be omitted.

Figure 5:
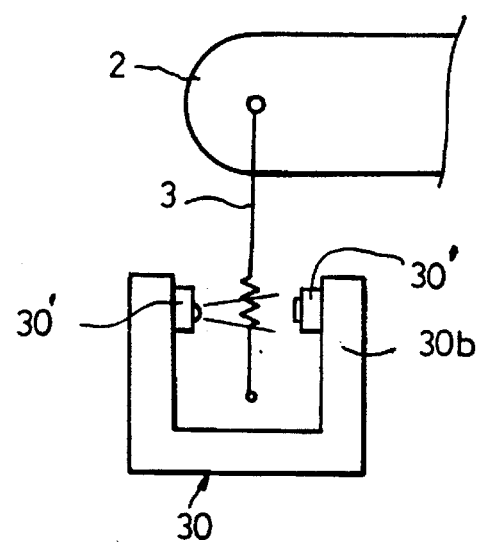
FIG. 5 i s an enlarged view of a tension sensing unit which constitutes a part of the tape tension control apparatus of FIG. 2.

As shown in FIG. 2, the tape tension control apparatus comprises a tension lever 2 pivotally mounted to a chassis of the VCR and a tension sensing unit 30 disposed near the lower end of the tension lever 2. As shown in FIGS. 2 and 5, the tension sensing unit 30 includes a pair of photosensors 30' are and a U-shaped support member 30b. The photosensors 30' are attached to upper portions of the facing inner side surface of the support member 30b. One of the photosensors 30' serves as a light emitting element whereas the other photosensor 30' serves as a light receiving element. A tension spring 3 is disposed between the photosensors 30' to urge the tension lever 2 in a direction that a tape is tensed. The spring 3 is fixed at one end thereof to the lower end of the tension lever 2 and at the other end thereof to a chassis (not shown) disposed in the lower portion of an inner space defined in the support member 30b.

The tape tension control apparatus further comprises a control unit electrically connected to the tension sensing unit 30. As shown in FIG. 2, the control unit comprises a correction amplifier 50 for amplifying and correcting an output signal from the photosensors 30', a microcontroller 60 for receiving an output signal from the correction amplifier 50 and thereby generating a control signal, and a motor drive 70 for receiving the control signal generated from the microcontroller 60 and thereby generating a control signal for driving a tension member driving unit 20.

Figure 3:
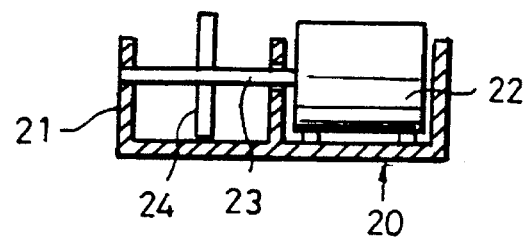
FIG. 3 is a sectional view of a tension member driving unit which constitutes a part of the tape tension control apparatus of FIG. 2.

As shown in FIGS. 2 and 3, the tension member driving unit 20 comprises a fixed member 21 fixedly mounted to the chassis of the VCR, a motor 22 fixedly mounted to the fixed member 21, a lead screw 23 integral with a shaft (not shown) of the motor 22, and a movable member 24 threadedly coupled to the lead screw 23. Preferably, the motor 22 is a stepping motor, even though limited thereto.

Figure 4:
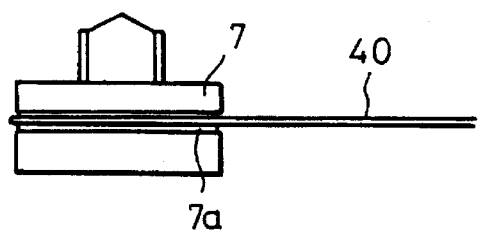
FIG. 4 is a side view showing a condition that a tension member is partially wound on a supply reel of a tape cassette.

On the other hand, an annular groove 7a is provided the peripheral surface of the supply reel 7, as shown in FIG. 4. in the annular groove 7a, a tension member, namely, a wire 40 is partially received. As shown in FIG. 2, the wire 40 is connected at one end thereof with a fixed member 41 fixedly mounted to the chassis by means of screw 41a. The other end of the wire 40 is connected to the movable member 24. In particular, the other end of the wire 40 connected to the tension member driving unit 20 has a tension coil spring portion 40a so as to more efficiently control the tension of the tape.

Now, an operation of the tape tension control apparatus having the above-mentioned construction in accordance with the first embodiment will be described.

Figure 6A:
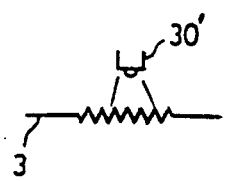
FIGS. 6A and 6B are schematic views respectively showing a retracted state and a stretched state of a tension spring depending on the amount of light sensed by a photosensor.
Figure 6B:

In a play mode operation of the VCR, the tension lever 2 pivots about its pin 19 by a tension of a tape 9 taken out of the supply reel 7. By the pivotal movement of the tension lever 2, the spring 3 connected to the tension lever 2 is retracted or stretched. As a result, the amount of light sensed by the photosensor 30' as the light receiving element is varied depending on the retracted or stretched condition of the spring 3, as shown in FIGS. 6A and 6B. FIG. 6A shows the retracted condition of the spring 3 whereas FIG. 8B shows the stretched condition of the spring 3.

The photosensor 30' as the light receiving element converts the amount of sensed light corresponding to the tensed state of the tape 9 into an electrical signal which is, in turn, transmitted to the correction amplifier 50. A signal outputted from the correction amplifier 50 is applied to the microcontroller 60 which, in turn, generates a control signal in accordance with a program previously stored. In accordance with the control signal from the microcontroller 60, the motor drive 70 generates a motor control signal by which the motor 22 of the tension member driving unit 20 is actuated.

As the motor 22 of the tension member driving unit 20 rotates in a normal direction or a reverse direction, the lead screw 23 integral with the shaft of the motor 22 rotates, so that the movable member 24 threadedly coupled to the lead screw 23 can move forwardly or rearwardly. By the forward or rearward movements of the movable member 24, the coil spring 40a provided at the other end of the wire 40 is stretched or retracted, so that the frictional force applied to the supply reel 7 by the wire 40 can be varied. Thus, the tension of the tape 9 can be controlled by the variation of the frictional force.

As mentioned above, the tension of the tape is sensed in the form of an electrical signal by the photosensors so that the tension member driving unit can be electrically controlled by the sensing signal, thereby enabling the tension of the tape to be adjusted, in accordance witch the first embodiment of the present invention. Accordingly, it is possible to variously control the tension of the tape, depending on the operating system of the VCR used and the material of the tape used. Also, the tension of the tape can be more precisely controlled.

Figure 7:
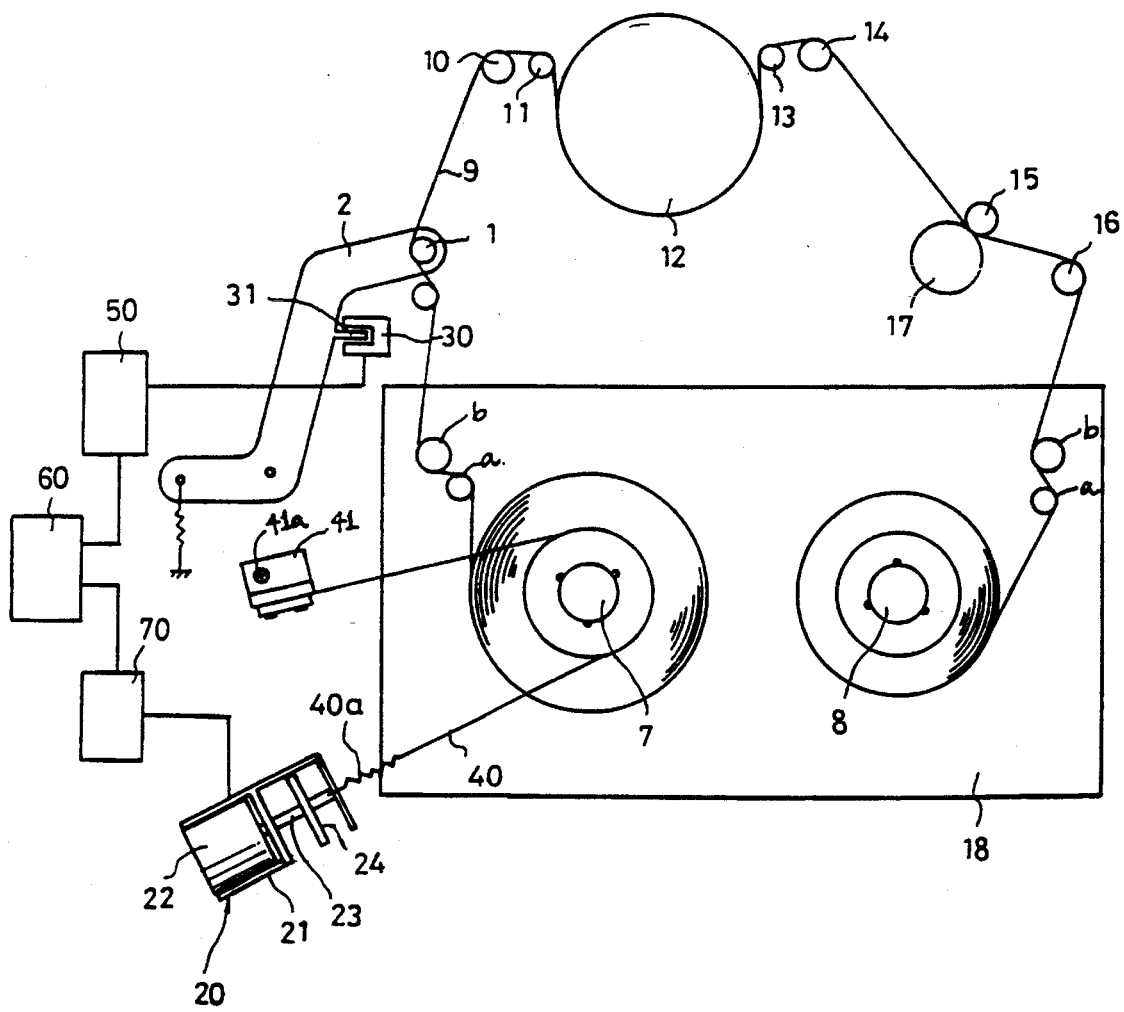
FIG. 7 is a schematic plan view of a tape tension control apparatus for a VCR in accordance with a second embodiment of the present invention.
Figure 8:
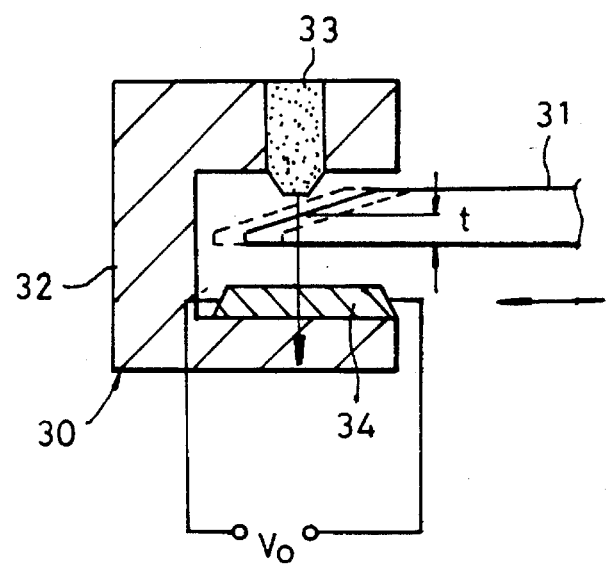
FIG. 8 is an enlarged view of a tension sensing unit of the tape tension control apparatus of FIG. 7.
Figure 9:
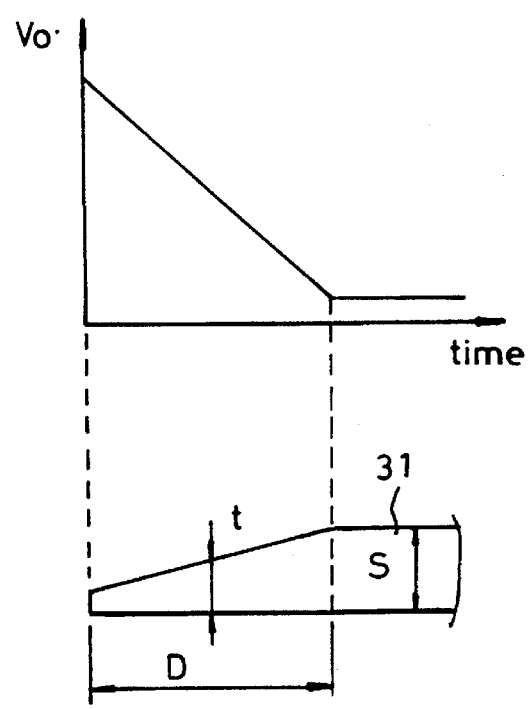
FIG. 9 is a graph showing a variation in an electrical signal detected by a Hall sensor, depending on the thickness of a sensing member.

Referring to FIGS. 7 to 9, there is illustrated a tape tension control apparatus in accordance with a second embodiment of the present invention. in FIG. 7, the reference numeral 2 denotes a tension lever. In FIGS. 7 to 9, elements corresponding to those in FIG. 2 are denoted by the same reference numerals. The VCR shown in FIG. 7 includes a system for travelling a magnetic tape 9 taken up around a supply reel 7. The tape travelling system of FIG. 7 is the same as that of FIG. 2 and, thus, its detailed description will be omitted. Also, the tape tension control apparatus of FIGS. 7 to 9 has the same construction as that of FIG. 2, except for a tension sensing unit. Accordingly, the same construction will be described no longer.

In accordance with the second embodiment of the present invention, the tape tension control apparatus comprises a tension sensing unit 30 disposed near one side portion of the tension lever 2, as shown in FIG. 7. The tension lever 2 has a sensing member 31 protruded from the right side portion thereof and constituting a part of the tension sensing unit 30. As shown in FIG. 8, the tension sensing unit 30 comprises a support member 32 having a 90°-inverted U-shape, a downwardly extending magnet 33 fitted in a throughout hole provided a the upper portion of the support member 32, and a Hall sensor 34 mounted on the lower portion of the support member 32. The sensing member 3 provided at the tension lever 2 is movable in rightward and leftward directions along a space defined in the support member 32, that is between the magnet 33 arid the Hall sensor 34. The sensing member 31 has a taper end so that the amount of magnetic lines of force received in the Hall sensor 34 may be varied as the sensing member 31 moves toward or away from the support member 32. FIG. 9 is a graph showing a variation in an electrical signal detected by the Hall sensor 34, depending on the thickness of the sensing member 31. In FIG. 9, the reference characters S, t and D represent the overall thickness of the sensing member 31, the thickness of the taper end of the sensing member 31 at a position where the magnetic lines of force enter, and the length of the taper end of the sensing member 31, respectively. Also, Vo represents the magnitude of the electrical signal outputted from the Hall sensor 34.

In accordance with the second embodiment, the electrical signal from the Hall sensor 34 varied depending on the tension of the tape 9 is transmitted to the correction amplifier 50. The microcontroller 60 receives an output signal from the correction amplifier 50 and thereby generates a control signal in accordance with a program previously stored. Based on the control signal from the microcontroller 60, the motor drive 70 outputs a motor control signal by which the motor 22 of the tension member driving unit 20 is actuated.

The operation of the tension member driving unit 20 is the same as that of the first embodiment and, thus, its description will be omitted.

Figure 10:
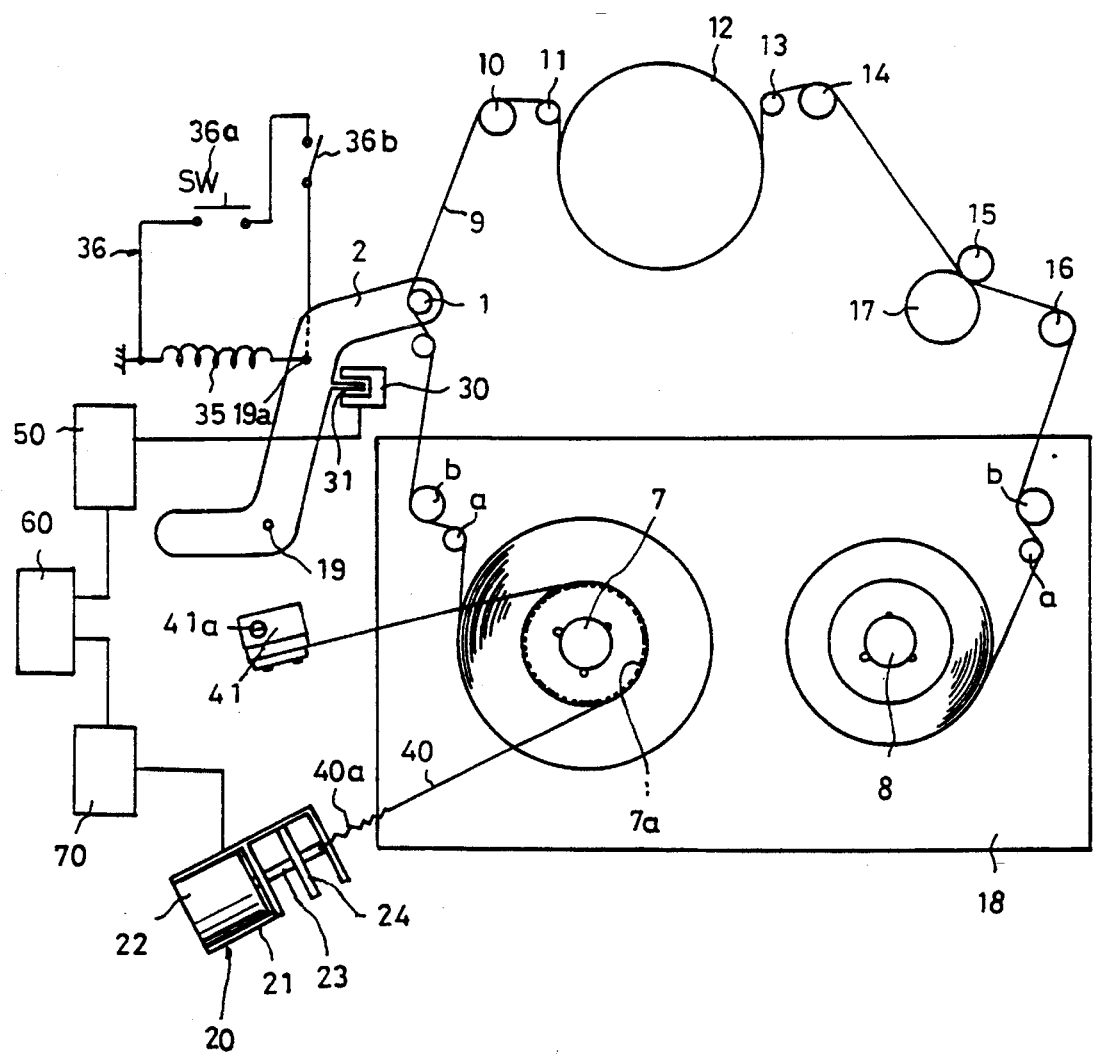
FIG. 10 is a schematic plan view of a tape tension control apparatus for a VCR in accordance with a third embodiment of the present invention.

FIG. 10 is a schematic plan view of a tape tension control apparatus in accordance with a third embodiment of the present invention. The tape tension control apparatus of FIG. 10 has a tension sensing unit and a construction associated therewith which are similar to those of FIG. 7. Accordingly, the tension sensing unit and the associated construction will be described no longer. In FIG. 10, elements corresponding to those of FIG. 7 are denoted by the same reference numerals.

In accordance with the third embodiment, the tape tension control apparatus comprises a tension spring 35 and a voltage application circuit 36 disposed at the other side portion of the tension lever 2, as compared to the second embodiment. The reason why the tension spring 35 and the voltage application circuit 36 are provided is to achieve a more precise tension control.

The tension spring 35 is connected at one end thereof to a protrusion 19a protruded from the left side portion of the tension lever 2 and at the other end thereof to the chassis not shown. Also, the tension spring 35 is electrically connected at both ends the roof to the voltage application circuit 36 such that a voltage is applied to the tension spring 35. Preferably, the tension spring 35 is made of a shape memory alloy. In some cases, the tension spring 35 may be made of a general alloy having a desired elastic coefficient. Since the engine spring 35 is electrically connected to the voltage application circuit 36, the shape of the tension spring 35 can be changed, depending on the voltage.

The voltage application circuit 36 has a mode switch 36a and a power input terminal 36b. The power input terminal 36b is the terminal for receiving a voltage from an external voltage source not shown.

In accordance with the third embodiment, the tension of the tape 9 is controlled by the tension sensing unit 30 in the same manner as in the second embodiment. In addition, the tension lever 2 is resiliently supported by the tension spring 35 electrically connected to the voltage application circuit 36. Accordingly, it is possible to more precisely and variously control the tension of the tape. In other words, as a voltage is applied to the tension spring 35, the tension spring 35 is stretched, so that its spring constant may be varied. By the variation in spring constant, the tension of the tension spring 35 applied to the tension lever 2 is varied, thereby enabling the tension of the tape 9 to be variously controlled. Thus, a more precise tension control is accomplished by the provision of the tension sensing unit 30, the tension spring 35 and the voltage application circuit 36 in accordance with the third embodiment.

Figure 11:
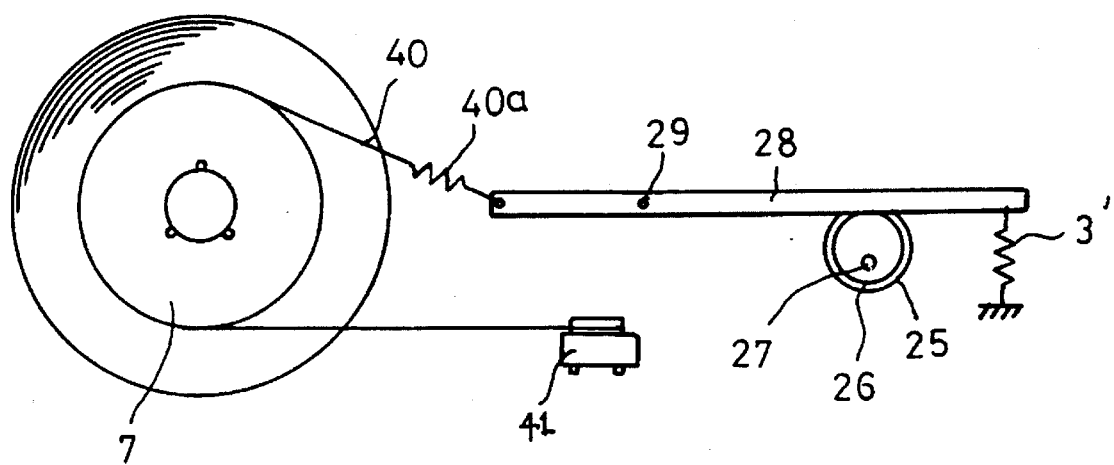
FIG. 11 is a schematic plan view of a tape tension control apparatus for a VCR in accordance with a fourth embodiment of the present invention.

FIG. 11 is a schematic plan view of a tape tension control apparatus in accordance with a fourth embodiment of the present invention. in FIG. 11, elements corresponding those in the above-mentioned embodiments are denoted by the same reference numerals. The VCR shown in FIG. 11 includes a system for travelling a magnetic tape 9 taken up around a supply reel 7. The tape travelling system of FIG. 11 is the same as that of the above-mentioned embodiment and, thus, its detailed description will be omitted.

in accordance with the fourth embodiment, the tension of the tape is controlled by a construction including a motor 25, an eccentric cam 26 and a lever 28, in place of the tension member driving unit used in the above-mentioned three embodiments. The lever 28 is pivotally mounted to the chassis (not shown) by means of a pin 29. The lever 28 is connected at one end thereof to the other end of the wire 40 having a tension spring portion 40*a*. The other end of the lever 28 is connected to a tension spring 3' which is fixed to the chassis The motor 5 is disposed beneath the lever 28 The eccentric cam 26 is fixedly mounted on a shaft 27 of the motor 27 such that it is in contact with the lower surface of the lever 23.

As the motor 25 drives the eccentric cam 26 rotates, thereof causing the lever 28 pivot about the pin 29. By the pivotal movement of the lever 28, the wire 40 is stretched or retracted to control the tension of the tape 9.

As apparent from the above description, the present invention provides a tape tension control apparatus for a VCR capable of controlling the tension of a tape by sensing the tension of a tape by sensing means such as a photosensor and a Hall sensor, and then electrically controlling tension member driving means, based on a sensing signal generated from the sensing means. Accordingly, it is possible to variously control the tension of the tape, depending on the operating system of the VCR used and the material of the tape used. Also, the tension of the tape car, be more precisely controlled. Consequently, the present invention can be advantageously applied to HD VSRs.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A tape tension control apparatus for a video cassette recorder comprising:

a tension lever pivotally mounted to a chassis of said video cassette recorder and adapted to apply a tension to a tape unwound from a tape cassette;

tension sensing means including a support member having a pair of opposed spaced side portions, a pair of photosensors attached to facing inner surfaces of said side portions of the support member, one of said photosensors serving as a light emitting element while the other photosensor serving as a light receiving element, and a tension spring disposed between the photosensors in a space defined by the side portions of the support member and connected at one end thereof to said tension lever and at the other end thereof to said chassis, said tension spring being adapted to urge said tension lever to pivot in a direction in which said tape is tensed;

a tension member operatively connected with a supply reel of said tape cassette and adapted to apply a variable frictional force to said supply reel;

tension member driving means operatively connected to said tension member to control the tension member and thereby control said variable frictional force applied to the supply reel in accordance with a sensing signal from said tension sensing means, said sensing signal being indicative of a sensed tension of the tape which is determined by the amount of light sensed by the light receiving element as the light is emitted from the light emitting element and varied by the physical condition of the tension spring; and control means adapted to control said tension member driving means in accordance with said sensing signal from the tension sensing means.

2. A tape tension control apparatus in accordance with claim 1, wherein said tension member is a wire which is partially received at its middle portion in an annular groove formed on a peripheral surface of said supply reel and has one end fixedly connected to a fixed member fixedly mounted to said chassis and the other end fixedly connected to said tension member driving means.

3. A tape tension control apparatus in accordance with claim 2, wherein said tension member has a tension coil spring portion at the other end thereof.

4. A tape tension control apparatus in accordance with claim 1, wherein said tension member driving means comprises a fixed member fixedly mounted to said chassis, a motor fixedly mounted to said fixed member, a lead screw fixedly mounted on a shaft of said motor, and a movable member threadedly coupled to said lead screw and connected to the tension member.

5. A tape tension control apparatus in accordance with claim 1, wherein said control means comprises a correction amplifier for amplifying and correcting an output signal from said photosensor serving as the light receiving element, a microcontroller for receiving an output signal from said correction amplifier and thereby generating a control signal, and a motor drive for receiving said control signal generated from said microcontroller and thereby generating a control signal for driving said tension member driving means.

\* \* \* \* \*